May 22, 1962   M. E. FRY   3,036,192
REMOVABLE OVEN LINER
Filed Oct. 15, 1958   5 Sheets-Sheet 1

INVENTOR.
Millard E. Fry
BY
Edwin S. Dybvig
His Attorney

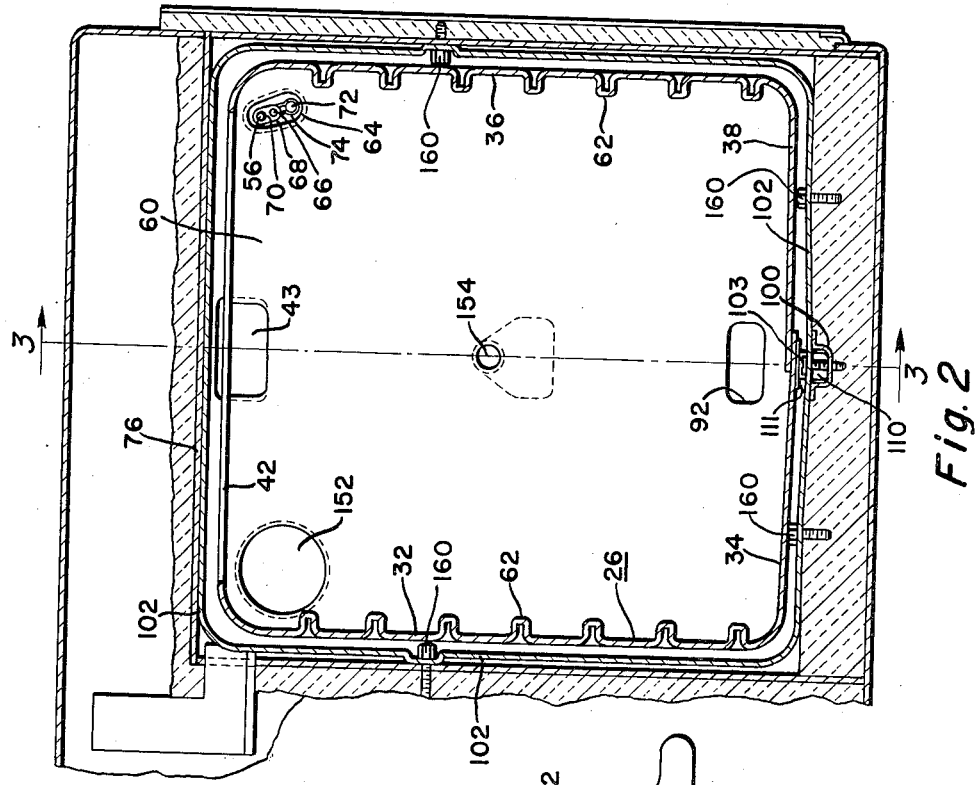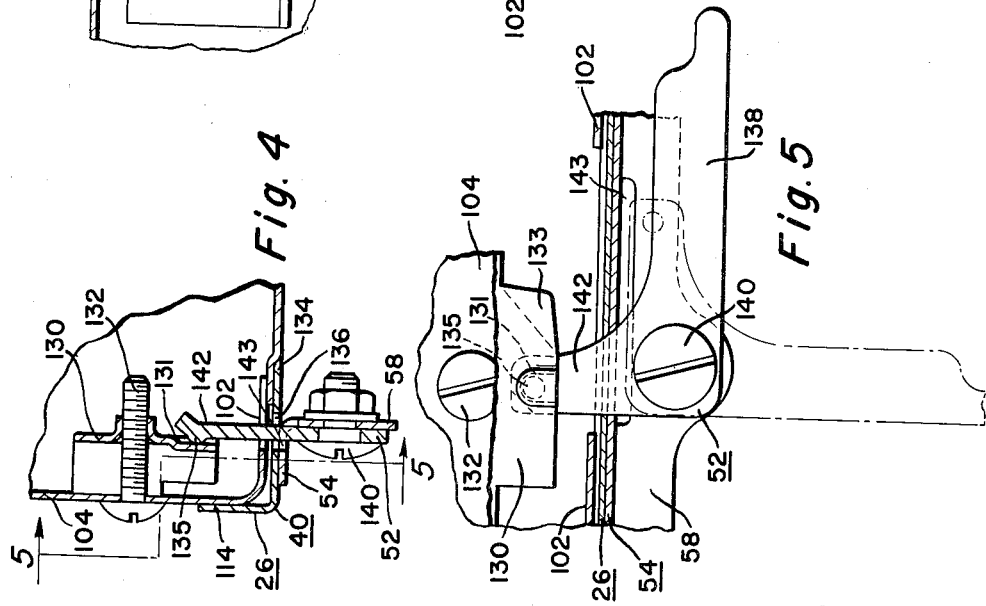

May 22, 1962 M. E. FRY 3,036,192
REMOVABLE OVEN LINER
Filed Oct. 15, 1958 5 Sheets-Sheet 3

INVENTOR.
Millard E. Fry
BY Edwin S. Dybvig
His Attorney

May 22, 1962

M. E. FRY 3,036,192

REMOVABLE OVEN LINER

Filed Oct. 15, 1958

INVENTOR.
Millard E. Fry
BY
Edwin S. Dybvig
His Attorney

May 22, 1962 M. E. FRY 3,036,192
REMOVABLE OVEN LINER
Filed Oct. 15, 1958 5 Sheets-Sheet 5

INVENTOR.
Millard E. Fry
BY Edwin S. Dybvig
His Attorney

United States Patent Office 3,036,192
Patented May 22, 1962

3,036,192
REMOVABLE OVEN LINER
Millard E. Fry, Dayton, Ohio, assignor to General Motors Corporation, Detroit, Mich., a corporation of Delaware
Filed Oct. 15, 1958, Ser. No. 767,426
11 Claims. (Cl. 219—35)

This invention relates to a domestic appliance and more particularly to an oven therefor having a removable liner.

One of the more distasteful cleaning procedures involved in housework is embodied in the problem of cleaning a range oven. Food which splatters from a cooking pan within an oven is severely baked upon the oven surface and is thus made extremely difficult to remove. The difficulty is increased by the fact that an oven is often in an awkward position for cleaning, a position that requires the housewife to stoop and stretch to reach the hidden crevices within the oven. Past attempts devoted to making an oven more accessible have been directed to removable doors, French doors or 180° drop doors. In all of these approaches, however, it is necessary to reach within the oven cavity during the cleaning procedure.

Accordingly, it is an object of this invention to provide an oven liner which is removable.

It is also an object of this invention to provide an oven with a removable liner having an opening in the top thereof to facilitate access to the liner interior for cleaning.

It is also an object of this invention to provide a removable oven liner having a top aperture with a removable cover for said aperture, said cover supporting a broil unit in a position for energizing said unit when said liner is placed within said oven cavity.

An additional object of this invention is to provide a removable oven liner with a latch for securing said liner in a position within an oven cavity and which, when released, will permit the withdrawal of the liner.

A further advantage of this invention resides in a slidable thermostat support for a removable liner wherein the thermostatic bulb is held in correct relationship to the oven heating element at all times.

A further object of this invention is to provide an adjusting means for a removable liner which can be manipulated to insure an air-tight, correctly positioned relationship of the liner to the oven cavity.

It is also an object of this invention to provide a removable liner for an oven cavity having an electrical receptacle, wherein said liner supports a removable heating element in position to engage said receptacle when said liner is slidably positioned within said cavity.

An additional object of this invention is embodied in an improved method for forming an oven liner which insures interchangeability of liner parts.

Further objects and advantages of the present invention will be apparent from the following description, reference being had to the accompanying drawings wherein a preferred embodiment of the present invention is clearly shown.

In the drawings:

FIGURE 2 is a fragmentary sectional view taken substantially along line 2—2 of FIGURE 3;

FIGURE 4 is a fragmentary sectional view of the oven liner latch in a locked position;

FIGURE 5 is a fragmentary view of the oven liner latch taken along line 5—5 of FIGURE 4 to show the locked and unlocked position of the latch;

Figure 1:
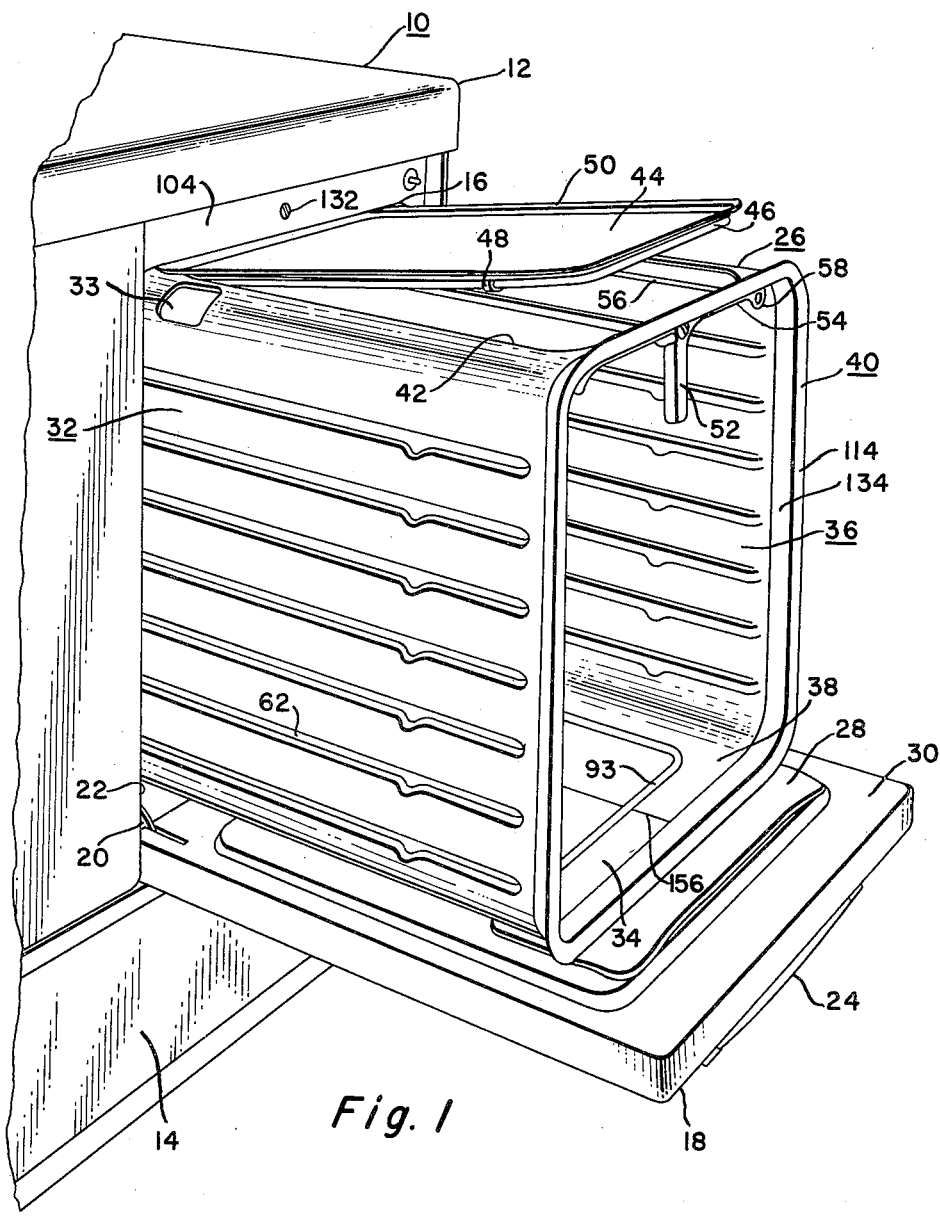
FIGURE 1 is a fragmentary perspective view of a range oven including a removable liner.

Reference may now be had to FIGURE 1 wherein a portion of a range 10 is illustrated to show the oven thereof. In particular, the range 10 is provided with a cooking top 12, a base portion or storage drawer 14 and an oven cavity 16. Arranged to close a front portion of the oven cavity 16 is a door 18 hingedly mounted at 20 to the bottom of a range frame opening 22. Attached to the door 18 for facilitating the opening thereof is a handle 24. This invention is directed to an oven liner arrangement for a range 10 wherein the liner, shown generally at 26, is adapted to be slidably removed from the oven cavity 16 through the range frame opening 22 to the withdrawn position of FIGURE 1. To form the opening 22 a range frame front wall 104 is formed with an inwardly turned peripheral flange 102. In the removed or withdrawn position for the liner 26, a resilient pad 28 may be placed on the inner wall 30 of the oven door 18 to support the outer end of the liner 26 when in its removed or withdrawn position. Of course, it is obvious that any suitable resilient support could be used to separate the rigid surfaces of the inner door panel 30 and the oven liner 26 to prevent chipping of the door enamel. For instance, silicone rubber feet could be installed on the bottom of the liner 26 as support means.

The removable liner 26 is formed with a left side wall portion 32 having a bottom wall segment 34 and a right side wall portion 36 having a bottom wall segment 38 which, in fabricating, is joined to left wall portion 34 in any suitable manner to assemble the completed side and bottom walls of the liner. For facilitating removal of cooking gases a port 33 is formed in a side wall 32 of the liner in a location which will align with the oven vent whenever the liner 26 is within the oven cavity 16. An oven liner front forming collar 40 defines the front opening to the oven liner 26. An aperture 42 is formed by the top portions of the left side wall 32 and right side wall 36, this opening being covered by a broil unit support plate or liner cover 44 to which the broil unit 46 is secured as by a bracket 48. The broil unit support plate 44 merely overlies the liner opening 42 and for this purpose is provided with a peripheral flange 50 for retaining the broil support plate 44 in position within the opening 42 when the liner 26 is slidably placed within the oven cavity 16. After the liner 26 is removed to the position of FIGURE 1, the cover 44 may be manually removed to expose the interior of the oven liner for cleaning purposes. A latch 52, to be explained more fully hereinafter, carried on a bracket 54 affixed to the front collar 40 of the liner serves to lock the liner 26 to the range frame opening 22 when the liner is placed within the oven cavity 16. Although the withdrawn position of the liner is shown as resting on the opened oven door 18, it is within the purview of this invention to make the liner 26 completely removable as will be described more fully hereinafter.

Figure 3:
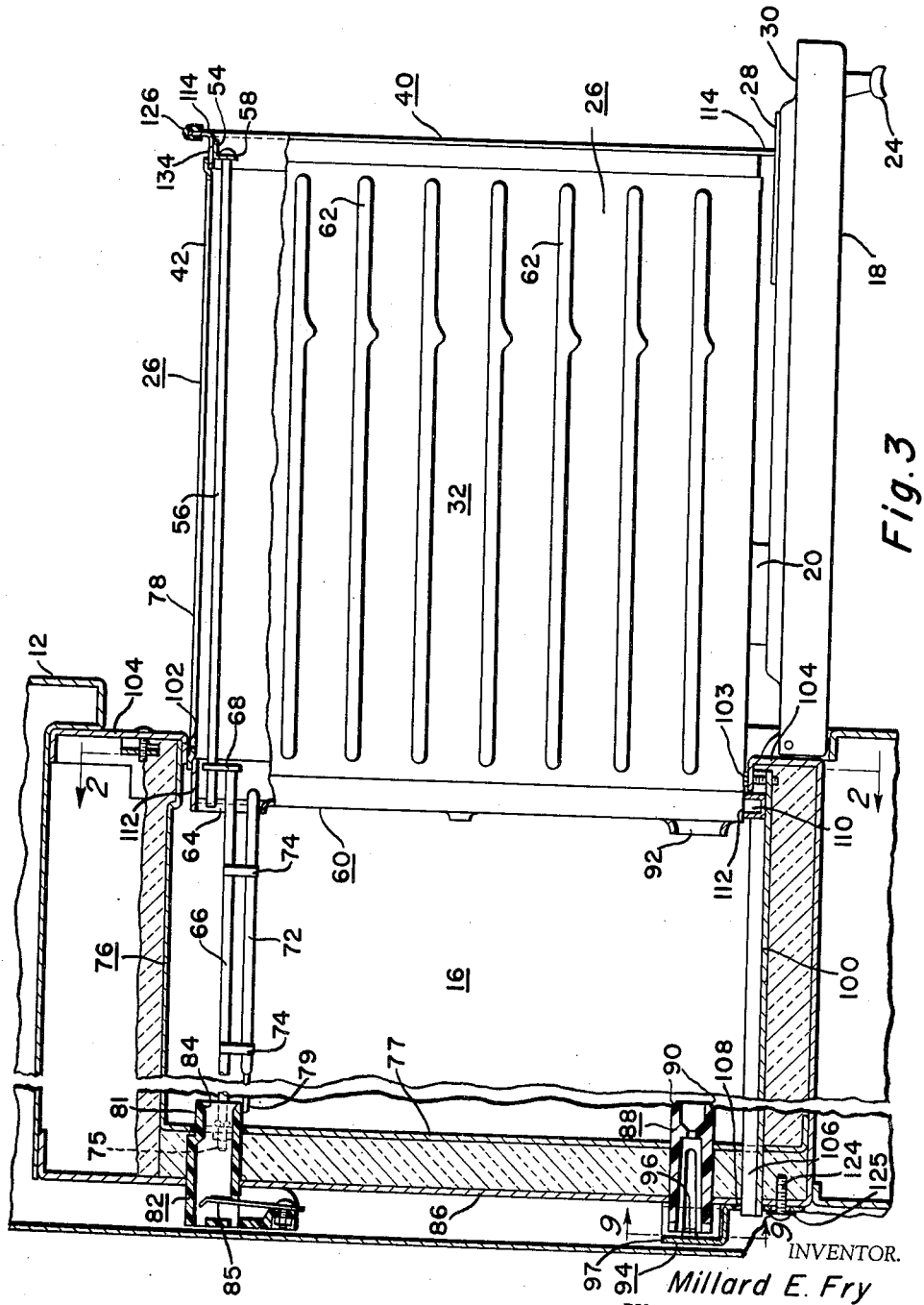
FIGURE 3 is a fragmentary sectional view with parts broken away taken substantially along line 3—3 of FIGURE 2 and showing an oven liner in a removed position.

A sectional view of the oven liner 26 in a removed position is best seen in FIGURE 3, the liner having a piece of the left wall portion 32 thereof broken away to expose a thermostat support slide 56 which is attached at one end to a depending tab 58 of the latch bracket 54. The liner 26 may be appropriately embossed or formed with oven rack slides 62 in accordance with conventional practice. A liner rear wall 60 has an opening 64 through which a thermostat support rod 66 may project into the oven liner 26. At one end of the thermostat support 66 is affixed a slide bracket 68. The slide bracket has an aperture or port 70 slightly larger than the thermostat support slide 56 to permit a relative sliding movement between the thermostat support slide 56 and the thermostat support rod 66. A thermostat bulb 72 is suspended by clamps or brackets 74 from the rod 66 which is fastened conventionally as at 75 to a rear wall 77 of an insulation retainer 76. It should be noted that the insulation retainer 76 serves also to define the top, back and both sides of the oven cavity 16. Thus, it may be seen that the thermostat bulb 72 will remain in a fixed position on the fixed support rod 66 and will move relative to the liner 26 as the liner is slidably moved in and out of the oven cavity 16. The slide bracket 68 operating on the support slide 56 will serve to guide the thermostat bulb 72 into a desirable temperature sensing position within the oven liner as the liner is moved into the oven cavity 16. The tubing 79 leading from the thermostat bulb 72 will, of course, connect with a remote oven temperature control device (not shown).

Figure 6:
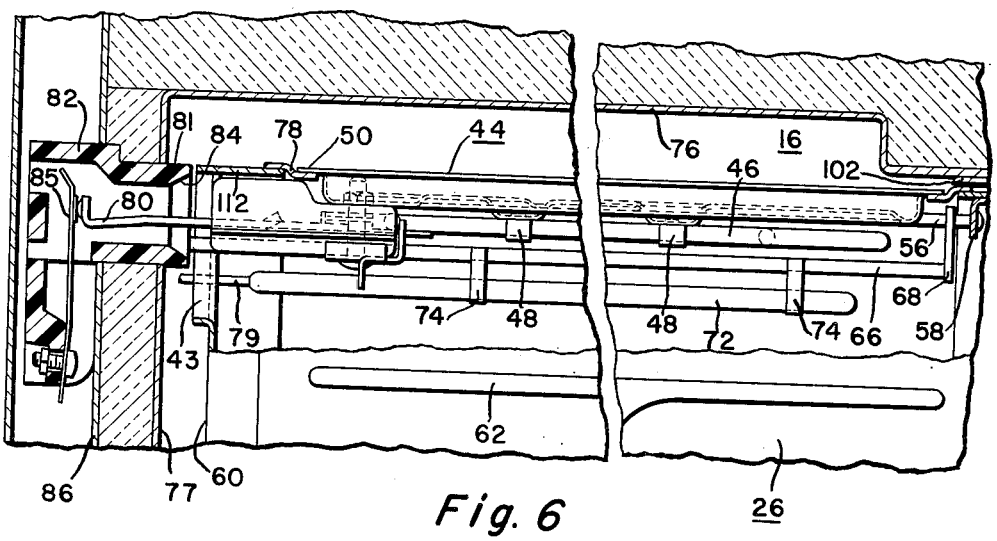
FIGURE 6 is a fragmentary sectional view of the oven liner within the oven cavity and showing the liner supported broil unit in energizing relationship with the cavity-mounted electrical receptacle.
Figure 7:
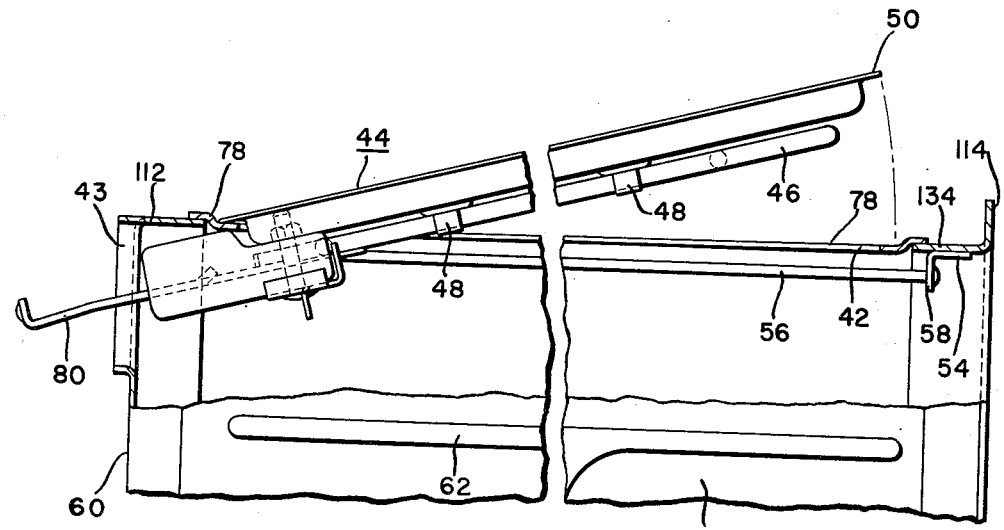
FIGURE 7 is a fragmentary sectional view of the oven liner with parts broken away showing the broil unit support cover in a partially removed position.

Reference may now be had to FIGURES 6 and 7 to obtain a full understanding of the broil unit support cover 44 and its relationship to the removable liner 26. FIGURE 3 shows the oven liner 26 with the broil unit support cover 44 removed completely to expose the interior of the liner 26 for cleaning. However, the cover 44 may be positioned within the opening 42, as indicated in FIGURES 1 and 7 and permitted to drop into a seated position, as more clearly illustrated in FIGURE 6. In particular, the cover plate 44 is shown with a peripheral flange 50 which overlies an edge portion 78 of the top opening 42 in the wall portions 32 and 36. As aforesaid, the heating element 46 is supported from the cover 44 by tabs 48 and, thus arranged, places the terminal portions 80 of the heating element 46 in a rearwardly extended position. In the rear wall 60 of liner 26, a broil unit receptacle opening 43 is formed to permit the terminal portions 80 to extend outside of the liner 26. The oven cavity 16 is partially defined by the insulation retainer 76 through the rear wall 77 of which projects a terminal receiving end 81 of an electrical receptacle of non-conducting material, shown generally at 82. The electrical receptacle 82 has an opening formed by tapered walls 84 to aid in directing the broil unit terminal portions 80 toward the interior of the receptacle 82. Within the receptacle 82 a contact blade 85 resides in a manner to engage the terminal portion 80 whenever the oven liner 26 is slidably pushed within the oven cavity 16.

The electrical receptacle 82 which projects through the insulation retainer rear wall 77 is installed in any conventional fashion on a range frame back 86. Similarly positioned is a bake unit receptacle 88 near the bottom of the oven cavity 16. The receptacle 88 is formed with tapered walls 90 which cooperate with a bake unit receptacle opening 92 to position the receptacle 88 in relation to the rear wall 60 of the oven liner and the bake unit heating element 93 which is adapted to rest on bottom wall segments 34, 38 of the liner 26.

A particular feature of this invention is embodied in the manner in which the broil and bake units are positioned with the insertion of the liner 26 in the oven cavity 16.

The electrical receptacle 88, in cooperating with the rear wall opening 92 of the liner 26, is utilized to adjust the positioning of the liner 26 within the oven cavity 16. The receptacle 88 is positioned also on the range frame back 86 and held in place by a bake unit receptacle retaining plate shown generally at 94. The retaining plate 94 is formed with ears 96 struck inwardly from rear wall 97 which slidably fit within a keyway 98 on each side of the porcelain receptacle 88, thus positioning the receptacle against pivotal deflection. Thus it may be seen that the electrical receptacles 82 and 88 are located at the rear of the oven cavity 16 in a manner to align both the oven liner 26 and the broil and bake units within the oven liner when the liner is slidably positioned within the oven cavity. At the same time the thermostat bulb 72 is held in correct relationship to the liner regardless of the repeated withdrawals of the liner 26.

The manner in which the liner 26 is slidably supported for sliding movement into and out of the oven cavity 16 will now be more fully described with reference to FIGURES 2 and 3. To provide a sliding guide for the liner 26 a channel member 100 extends from the front of the oven cavity rearwardly. At one end of the channel 100 a bolt 103 is utilized to secure the channel 100 to the bottom of the peripheral flange 102 of the range frame front 104. The other end 106 of the channel 100 projects through an opening 108 in the bake unit receptacle retaining plate 94. Since the front end of the channel 100 is fixed relative to the range frame front 104, the adjustable positioning feature of this invention is effected at the rearward end 106 of the slide channel 100. A skid 110 is fastened to the bottom flange 112 of the liner rear wall portion 60 in a manner to position the skid 110 within the channel 100. Any suitable lubricant may be utilized to facilitate the quiet and efficient sliding movement between the skid 110 and the channel 100 as the liner 26 is slidably moved into and out of the oven cavity 16. To form the skid 110 a rectangular piece of metal is drawn into a cup-like shape having a connecting flange 111 by which the skid may be attached to the liner. The skid should be sized so that a slight tolerance exists between the skid and the slide channel 100. In this way lateral movement of the liner 26 along the rear wall 60 thereof will be held to a minimum and the liner will easily slide in and out of the oven cavity 16 with the cooperating parts between liner and oven cavity correctly aligned.

Figures 8, 9:
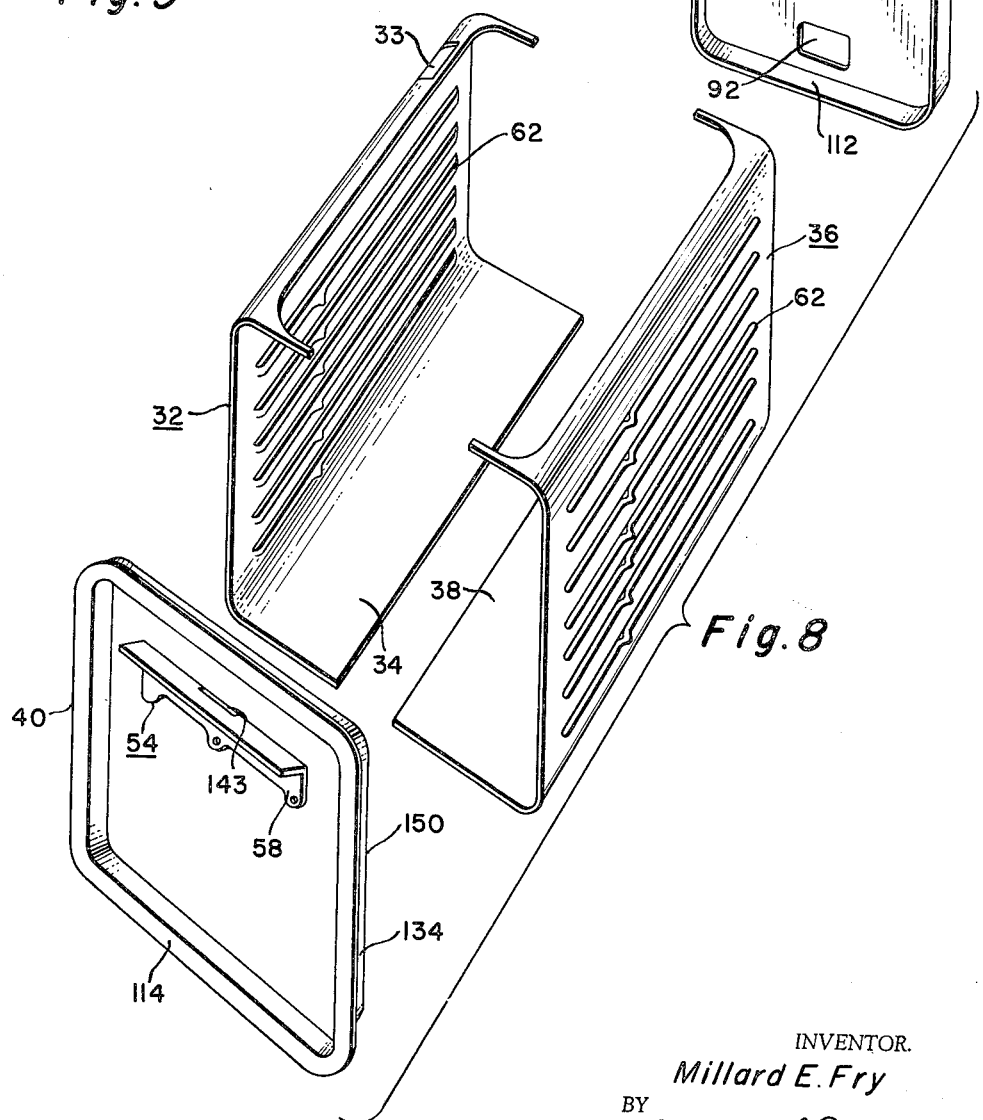
FIGURE 8 is an exploded view of the oven liner.
FIGURE 9 is a sectional view taken along line 9—9 of FIGURE 3 with parts broken away to illustrate the combination bake unit receptacle retainer and oven liner adjusting plate.

It is imperative that the peripheral flange 114 of the liner opening collar 40 be retained in a snugly fitting relationship to the range frame front 104 whenever the liner 26 is in place within the oven cavity 16. For this reason, the rearward end 106 of the support slide 100 is made adjustable through the bake unit receptacle retainmounting flanges 118 project and receptacle positioning bracket 94 in a manner now to be described. With reference to FIGURE 9, the bracket 94 is shown with a top receptacle receiving portion 116 from which side tabs 96 are formed. Depending from the receptacle mounting portion 116 in a bottom mounting flange 120 which together with flanges 118 each have a port 122 drilled therein. The ports 122 are drilled extra large to permit a universal adjustment of the rearward end 106 of the channel 100. Fastening means such as a bolt 124 are utilized together with internal-external lock washers 125 to securely lock the retaining plate 94 in relation to the range frame back 86 once the slide 100 is positioned in a manner to locate the liner front flange 114 flush to the range frame front 104. Of course, it should be obvious that a rubber seal, a segment of which is shown at 126, may overlie the peripheral flange 114 of the liner front collar 40 in a manner to both seal the flange 114 tightly against the range frame front 104 at the same time that it seals the flange 114 against the inner wall 30 of the oven door 18 when closed.

As a further aid in snugly fitting the liner 26 within the oven cavity 16, a latch, shown generally at 52 (FIGURES 4 and 5), may be utilized. A latch keeper bracket 130 is fastened as by a bolt 132 to the range frame front 104 in a position approximately at the center of the top portion of the range frame opening 22. The bracket 130 is formed with a striker plate section 133 which is partially bent frontwardly as an aid to latching liner 26 to the range frame front 104. The front collar 40 which forms the opening for the liner 26 is comprised of the vertical peripheral flange 114 which abuts against the range frame front 104 and a horizontally arranged peripheral flange 134 in which an opening 136 is formed to permit movement of a latch bolt 142. Attached to the liner front collar 40 is the latch bracket 54 having a depending flange 58 for supporting the latch arm 138. The latch arm 138 is pivotally mounted as by a bolt 140 to the latch bracket flange 58 and arranged to be positioned between a liner locked position, shown in solid, and a liner unlocked position, shown in phantom line (FIGURE 5). The latch arm 138 has a configuration similar to a bellcrank by which a bolt section 142 projects through an opening 143 in the latch bracket 54 and is positioned behind the latch plate 130 for securely retaining the liner to the range frame front 104. To effect a more positive latching the latch plate 130 is formed with a depression 131 to receive a protuberance 135 on bolt section 142.

To operate the range 10 having the removable oven liner of this invention, the housewife need merely unlatch the liner 26 by turning the latch handle 138 to the position shown in FIGURE 1 or in phantom in FIGURE 5. The liner may then be grasped by the latch bracket 54 or the latch handle 138 and withdrawn from the oven cavity 16. If a support pad 28 is provided, it is removed from the storage drawer 14 of the range 10 and placed upon the inner wall 30 of the open door 18. The peripheral flange 114 of the liner opening collar 40 is then placed upon the resilient pad 28. For cleaning the liner 26, the broil unit support cover 44 is removed to provide complete access to the interior of the oven liner. The grease and dirt which have collected upon the interior walls of the liner may then be quickly and easily removed while the operator is in a position more conducive to such a cleaning operation. In so doing the pad 28 will prevent relative movement between liner 26 and the oven door 18, thereby preventing marring or chipping of the porcelain or paint covering these structures. The design described hereinabove contemplates a cleaning of the liner 26 while the liner rests on the oven door 18. For this reason the skid 110 is permanently attached to the liner to prevent the removal thereof unless or until the oven door 18 is disconnected. However it is within the scope of this invention to make the skid 110 removable from the liner 26 as by a wing nut or other conventional fastening means. In this latter arrangement a simple release of the skid 110 from the liner 26 will permit the liner to be removed completely from the range 10 to another location for cleaning.

Another feature of this invention includes the novel manner in which the removable liner is manufactured and reference may be had to FIGURE 8 in this regard. As aforesaid, the oven liner is comprised of a front collar 40, left side wall portion 32, right side wall portion 36, and a rear wall 60. In order to insure that proper tolerances are maintained, the collar 40 and rear wall 60 are formed from one piece in what is commonly called a two-for-one process. Initially, a dished-out portion is drawn including both the collar 40 and the rear wall 60. The openings in the combination piece such as 152 for the oven light, 154 for the rotisserie insert and the openings 43, 92 for the electrical broil and bake receptacles, respectively, are punched. Then the element is placed on a cutting or severing machine which separates parts 40 and 60 along the edge 150. Thus, the front and rear members of the oven liner 26 are always formed of the same size and insure an adequate fit within any production oven cavity 16. Side wall portions 32 and 36 are formed with the slides 62 as aforesaid, and with the vent opening 33 which aligns with the range vent (not shown) when the liner 26 is installed within the oven cavity 16. The side portions 32 and 36 are then positioned to overlie the flange 134 of the front collar 40 and the flange 112 of the rear wall 60 and spot-welded or fastened in any conventional manner to form a unitary assembly. The bottom wall portions 34 and 38 are lapped and also welded as at 156. Thus, a liner which is of consistent size is readily and easily formed.

It should now be seen that a simplified method of manufacture had been provided for an oven liner which may be slidably removable in an easy manner to facilitate the cleaning thereof and which may be adjusted in a novel manner to insure a snug fit between the range opening and the removable liner. The manner in which the liner 26 is skid supported along its rear wall 60 has been set forth hereinbefore. It now remains only to show one method by which the liner may be supported relative to the oven front wall 104 and the flange 102 thereof. It is desirable to provide a liner which will glide effortlessly and noiselessly relative to the metal oven frame. Research has determined that a nickel plated object provides satisfactory results when slidably supporting a porcelain coated surface. For this reason a plurality of bolts or studs 160 having nickel plated head portions are secured at spaced intervals about the sides and bottom of the range front opening flange 102 as best seen in FIGURE 2. Although the porcelain on nickel effects a suitable sliding pair, it should be understood that other materials could be used without departing from the scope of this invention.

While the form of embodiment of the invention as herein disclosed constitutes a preferred form, it is to be understood that other forms might be adopted, as may come within the scope of the claims which follow.

What is claimed is as follows:

1. In combination with a cooking oven having a source of energy and a fixed thermally responsive device, a removable open-top inner container movable relative to said thermally responsive device and said oven and having a first position wherein said thermally responsive device is substantially inside said container and a second position wherein said thermally responsive device is substantially outside said container, a heating element carried in said container and having a portion thereof adapted to slidably engage said source of energy when said liner is in said first position, and a container movement compensating support for said thermally responsive device, said support including a rod member fixed at one end to said oven for carrying said thermally responsive device and having a bracket portion at the other end thereof and a slide member fixed at one end thereof to said container and having another end extending into relatively slidable connected engagement with said bracket portion for guiding said thermally responsive device in and out of said container as said container moves between said first and second positions.

2. In combination, a removable liner for an oven casing having a casing opening for receiving said liner, said liner having an access opening portion coplanar with said casing opening, a door fixed relative to said casing for closing said access opening portion, a liner support member fixed relative to one portion of said oven casing and extending to another portion of said oven casing, said support member guidingly supporting said liner, an adjusting member on said oven casing having means for receiving the extending end of said support member, and means for moving said adjusting member relative to said oven casing for locating said liner access opening portion in said oven casing in heat sealing relationship to said door.

3. In combination, a removable liner for an oven casing having a casing opening for receiving said liner, said liner having an access opening portion coplanar with said casing opening, a door fixed relative to said casing for closing said access opening portion, a liner support member for carrying said liner and fixed relative to a front portion of said oven casing and extending through a back portion of said oven casing, an adjusting plate on said back portion having an aperture for receiving the extending end of said support member, means for moving said adjusting plate relative to said back portion for locating said liner access opening portion in heat sealing relationship to said door, and a member affixed to said liner and carried in said support member for guiding said liner between a first position within said oven casing and a second position without said oven casing.

4. In combination, a removable liner for an oven, said oven having a rear wall and a front opening, a heating unit for said oven, a receptacle for said unit, a channel slide member fixed relative to said opening and extending through said rear wall, a retaining plate on said rear wall having an aperture for receiving one end of said channel member and a portion for holding said receptacle, means for adjusting said retaining plate relative to said rear wall for adjusting said liner and said receptacle relative to said opening, and a skid member affixed to said liner and carried in said channel for slidably supporting said liner between a first position within said oven and a second position without said oven.

5. In combination with an oven having an access door, an electrical receptacle and a heat sensing device, a removable liner having a cooking position and a cleaning position and comprising a rear wall, a front collar and complementary side portions forming side and bottom walls and a top aperture, a removable cover for said aperture, a heating element carried by said cover and having terminal sections adapted to cooperate with said receptacle when said liner is in said cooking position, a latch for retaining said liner in said cooking position, and a resilient pad interposed between said front collar and said access door for supporting said liner in said cleaning position.

6. In combination with an oven having a door movable between vertical and horizontal positions, a source of energy, means including a heat sensing device for controlling said energy source, a removable liner having a cooking position in said oven when said door is in said vertical position and a cleaning position when said door is in said horizontal position, said liner comprising rear, side and bottom walls and having a top aperture, and a heating element supported to overlie said top aperture when said liner occupies said cooking position, said heating element having a terminal section connected to said source of energy when said liner is in said cooking position, said aperture providing access to the rear, side and bottom walls for cleaning purposes when said liner is in said cleaning position, and means interposed between said front end and said door for supporting the front end of said liner when said liner is in said cleaning position.

7. In combination, a removable liner for an oven having an energy source and a door in juxtaposition to one side of said liner, said liner having a heating element terminal opening, and unitary means for simultaneously universally adjusting said liner into coplanar heat sealing relationship with said door and said opening into aligned relationship with said energy source.

8. In combination with an oven having a door movable between vertical and horizontal positions, a source of energy, means including a heat sensing device for controlling said energy source, a removable liner having a cooking position in said oven when said door is in said vertical position and a cleaning position when said door is in said horizontal position, said liner comprising rear, side and bottom walls and having a top aperture, and a heating element supported to overlie said top aperture when said liner occupies said cooking position, said heating element having a terminal section connected to said source of energy when said liner is in said cooking position, said aperture providing access to the rear, side and bottom walls for cleaning purposes when said liner is in said cleaning position, and means interposed between said front end and said door for supporting the front end of said liner when said liner is in said cleaning position, and means for simultaneously adjusting said side and bottom walls into heat sealing relationship with said door and said rear wall into aligned relationship with said energy source.

9. In combination, a removable liner for an oven having an energy source and a door in juxtaposition to one side of said liner, said liner having a heating element terminal opening, and means for universally adjusting said liner into coplanar heat sealing relationship with said door and for universally adjusting said opening to said energy source.

10. In combination with an oven having a door movable between closed and open positions, a source of energy, means including a heat sensing device for controlling said energy source, a removable liner having a cooking position in said oven when said door is in said closed position and a cleaning position when said door is in said open position, said liner comprising rear, side and bottom walls and having a top aperture, and a heating element carried by the liner for movement therewith into and out of the oven, said heating element having a terminal section connected to said source of energy when said liner is in said cooking position, said aperture providing access to the rear, side and bottom walls for cleaning purposes when said liner is in said cleaning position, and means interposed between the front end of said liner and said door for supporting the front end of said liner when said liner is in said cleaning position.

11. In combination with an oven having a door movable between closed and open positions, a source of energy, means including a heat sensing device for controlling said energy source, a removable liner having a cooking position in said oven when said door is in said closed position and a cleaning position when said door is in said open position, said liner comprising rear, side and bottom walls and having a top aperture, and a heating element carried by the liner for movement therewith into and out of the oven, said heating element having a terminal section connected to said source of energy when said liner is in said cooking position, said aperture providing access to the rear, side and bottom walls for cleaning purposes when said liner is in said cleaning position, and means including said door in said open position for supporting the front end of said liner when said liner is in said cleaning position.

References Cited in the file of this patent

UNITED STATES PATENTS

| Number | Name | Date |
|---|---|---|
| 889,236 | Janes | June 2, 1908 |
| 1,046,059 | Earnest | Dec. 3, 1912 |
| 1,128,755 | Carlson | Feb. 16, 1915 |
| 1,137,050 | Carlson | Apr. 27, 1915 |
| 1,740,785 | Rogers et al. | Dec. 24, 1929 |
| 2,116,669 | Dadson | May 10, 1938 |
| 2,222,065 | Blakeslee | Nov. 19, 1940 |
| 2,236,992 | Broadley | Apr. 1, 1941 |
| 2,277,845 | Clark | Mar. 31, 1942 |
| 2,279,064 | Rutenber | Apr. 7, 1942 |
| 2,408,295 | Cossin | Sept. 24, 1946 |
| 2,456,988 | Pierson | Dec. 21, 1948 |
| 2,473,467 | Burt | June 14, 1949 |
| 2,486,701 | Berg | Nov. 1, 1949 |
| 2,535,379 | White | Dec. 26, 1950 |
| 2,569,775 | Pearce | Oct. 2, 1951 |
| 2,638,894 | Corn | May 19, 1953 |
| 2,725,454 | Wilcox | Nov. 29, 1955 |
| 2,746,448 | Holmsten | May 22, 1956 |
| 2,828,401 | Tuttle | Mar. 25, 1958 |
| 2,841,132 | Philip | July 1, 1958 |

FOREIGN PATENTS

| Number | Country | Date |
|---|---|---|
| 605,265 | Great Britain | July 20, 1948 |
| 1,016,946 | France | Sept. 10, 1952 |